(12) United States Patent
Ishikawa et al.

(10) Patent No.: US 11,392,331 B2
(45) Date of Patent: Jul. 19, 2022

(54) PRINT PROCESSING DEVICE AND NON-TRANSITORY COMPUTER READABLE MEDIUM STORING PROGRAM CAUSING COMPUTER TO EXECUTE PRINT PROCESS AND PROCESSOR

(71) Applicant: FUJIFILM Business Innovation Corp., Tokyo (JP)

(72) Inventors: Shogo Ishikawa, Yokohama (JP); Megumi Yamaguchi, Yokohama (JP); Daisuke Noguchi, Yokohama (JP); Masatake Kawabe, Yokohama (JP); Shingo Tajima, Yokohama (JP); Bo Liu, Yokohama (JP); Takashi Kikumoto, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/824,766

(22) Filed: Mar. 20, 2020

(65) Prior Publication Data

US 2021/0109685 A1    Apr. 15, 2021

(30) Foreign Application Priority Data

Oct. 10, 2019  (JP) .............................. JP2019-187019

(51) Int. Cl.
*G06F 15/00*    (2006.01)
*G06F 3/12*     (2006.01)

(52) U.S. Cl.
CPC ............ *G06F 3/121* (2013.01); *G06F 3/1204* (2013.01); *G06F 3/1219* (2013.01); *G06F 3/1239* (2013.01)

(58) Field of Classification Search
CPC ...... G06F 3/121; G06F 3/1204; G06F 3/1219; G06F 3/1239
USPC ......................................................... 358/1.15
See application file for complete search history.

(56) References Cited

U.S. PATENT DOCUMENTS

| | | | | |
|---|---|---|---|---|
| 5,938,354 | A  * | 8/1999 | Yasui ..................... | B41J 11/009 101/484 |
| 8,770,869 | B2 * | 7/2014 | Nakamaru ............... | B41J 15/00 400/76 |
| 2015/0363150 | A1 | 12/2015 | Gaertner et al. | |
| 2020/0081674 | A1* | 3/2020 | Fukami ................. | G06F 3/1235 |

FOREIGN PATENT DOCUMENTS

| | | |
|---|---|---|
| JP | 2011-173347 | 9/2011 |
| JP | 2016-004584 | 1/2016 |

OTHER PUBLICATIONS

English language machine translation of JP 2011-173347.

* cited by examiner

*Primary Examiner* — Mark R Milia
(74) *Attorney, Agent, or Firm* — Fildes & Outland, P.C.

(57) ABSTRACT

Provided is a print processing device including a processor configured to: use paper information including at least information of remaining amounts of a plural stack of continuous paper as information of the continuous paper and print processing information including information of print processes; and display information of at least one of executable print processes that are executable based on paper information of specific continuous paper including information of a remaining amount of the specific continuous paper among the plural stacks of continuous paper.

7 Claims, 10 Drawing Sheets

FIG.3

| CONTINUOUS PAPER NAME | REMAINING PAPER AMOUNT | PAPER WIDTH | COAT ATTRIBUTE | PAPER THICKNESS | OPEN DATE | ... |
|---|---|---|---|---|---|---|
| CONTINUOUS PAPER A | 1000m | 15inch | ABSENCE | 0.5mm | JULY 1 | ... |
| CONTINUOUS PAPER B | 1200m | 15inch | ABSENCE | 0.5mm | JULY 11 | ... |
| CONTINUOUS PAPER C | 1200m | 15inch | PRESENCE: α | 0.5mm | JUNE 1 | ... |
| CONTINUOUS PAPER D | 1600m | 15inch | PRESENCE: β | 0.5mm | JUNE 11 | ... |
| CONTINUOUS PAPER E | 2000m | 15inch | ABSENCE | 0.5mm | JULY 21 | ... |
| ... | ... | ... | ... | ... | ... | ... |

FIG.4

| JOB NAME | PAPER USAGE AMOUNT | PAPER WIDTH | COAT ATTRIBUTE | PAPER THICKNESS | ... |
|---|---|---|---|---|---|
| JOB 1 | 400m | 15inch | ABSENCE | 0.5mm | ... |
| JOB 2 | 350m | 15inch | ABSENCE | 0.5mm | ... |
| JOB 3 | 200m | 15inch | PRESENCE: α | 0.5mm | ... |
| JOB 4 | 1300m | 15inch | PRESENCE: α | 0.5mm | ... |
| JOB 5 | 200m | 15inch | ABSENCE | 0.5mm | ... |
| JOB 6 | 100m | 15inch | ABSENCE | 0.5mm | ... |
| JOB 7 | 500m | 15inch | ABSENCE | 0.5mm | ... |
| JOB 8 | 350m | 15inch | ABSENCE | 0.5mm | ... |
| JOB 9 | 1000m | 15inch | PRESENCE: β | 0.5mm | ... |
| ... | ... | ... | ... | ... | ... |

| JOB NAME | PAPER USAGE AMOUNT | PAPER WIDTH | COAT ATTRIBUTE | PAPER THICKNESS |
|---|---|---|---|---|
| JOB 1 | 400m | 15inch | ABSENCE | 0.5mm |
| JOB 2 | 350m | 15inch | ABSENCE | 0.5mm |
| JOB 3 | 200m | 15inch | PRESENCE: α | 0.5mm |
| JOB 4 | 1300m | 15inch | PRESENCE: α | 0.5mm |
| JOB 5 | 200m | 15inch | ABSENCE | 0.5mm |
| JOB 6 | 100m | 15inch | ABSENCE | 0.5mm |
| JOB 7 | 500m | 15inch | ABSENCE | 0.5mm |
| JOB 8 | 350m | 15inch | ABSENCE | 0.5mm |
| JOB 9 | 1000m | 15inch | PRESENCE: β | 0.5mm |

PRIORITIZE CONTINUOUS PAPER WHOSE OPEN DATE IS EARLY

PRINT PROCESSING DEVICE AND NON-TRANSITORY COMPUTER READABLE MEDIUM STORING PROGRAM CAUSING COMPUTER TO EXECUTE PRINT PROCESS AND PROCESSOR

CROSS-REFERENCE TO RELATED APPLICATIONS

This application is based on and claims priority under 35 USC 119 from Japanese Patent Application No. 2019-187019 filed on Oct. 10, 2019.

BACKGROUND

Technical Field

The present invention relates to a print processing device, a non-transitory computer readable medium storing a program causing a computer to execute print process, and a processor.

Related Art

Patent Literature 1 describes a media information management device for an image recording device, which can manage media information without printing a barcode or the like and manage media information even when other roll papers are removed during recording in the image recording device having a multi-stage roll paper configuration, and improves convenience of a user.

CITATION LIST

Patent Literature

Patent Literature 1: JP-A-2011-173347

SUMMARY

Aspects of non-limiting embodiments of the present disclosure relate to reduce waste of continuous paper as compared with a configuration in which continuous paper capable of executing at least one of print processes is manually selected from a plural stacks of continuous paper.

Aspects of certain non-limiting embodiments of the present disclosure address the above disadvantages and/or other disadvantages not described above. However, aspects of the non-limiting embodiments are not required to address the disadvantages described above, and aspects of the non-limiting embodiments of the present disclosure may not address any of the disadvantages described above.

According to an aspect of the present disclosure, there is provided a print processing device including a processor configured to: use paper information including at least information of remaining amounts of a plural stacks of continuous paper as information of the continuous paper and print process information including information of a plurality of print processes; and display information of at least one of executable print processes that are executable based on paper information of a specific continuous paper including information of a remaining amount of the specific continuous paper among the plural stacks of continuous paper.

BRIEF DESCRIPTION OF DRAWINGS

Exemplary embodiment(s) of the present invention will be described in detail based on the following figures, wherein:

FIG. 3 shows an example of paper information stored in a management device;

FIG. 4 shows an example of job information stored in a storage of the print processing device;

DETAILED DESCRIPTION

First Exemplary Embodiment

A continuous paper management system 10 according to a first exemplary embodiment will be described below.

Figure 1:
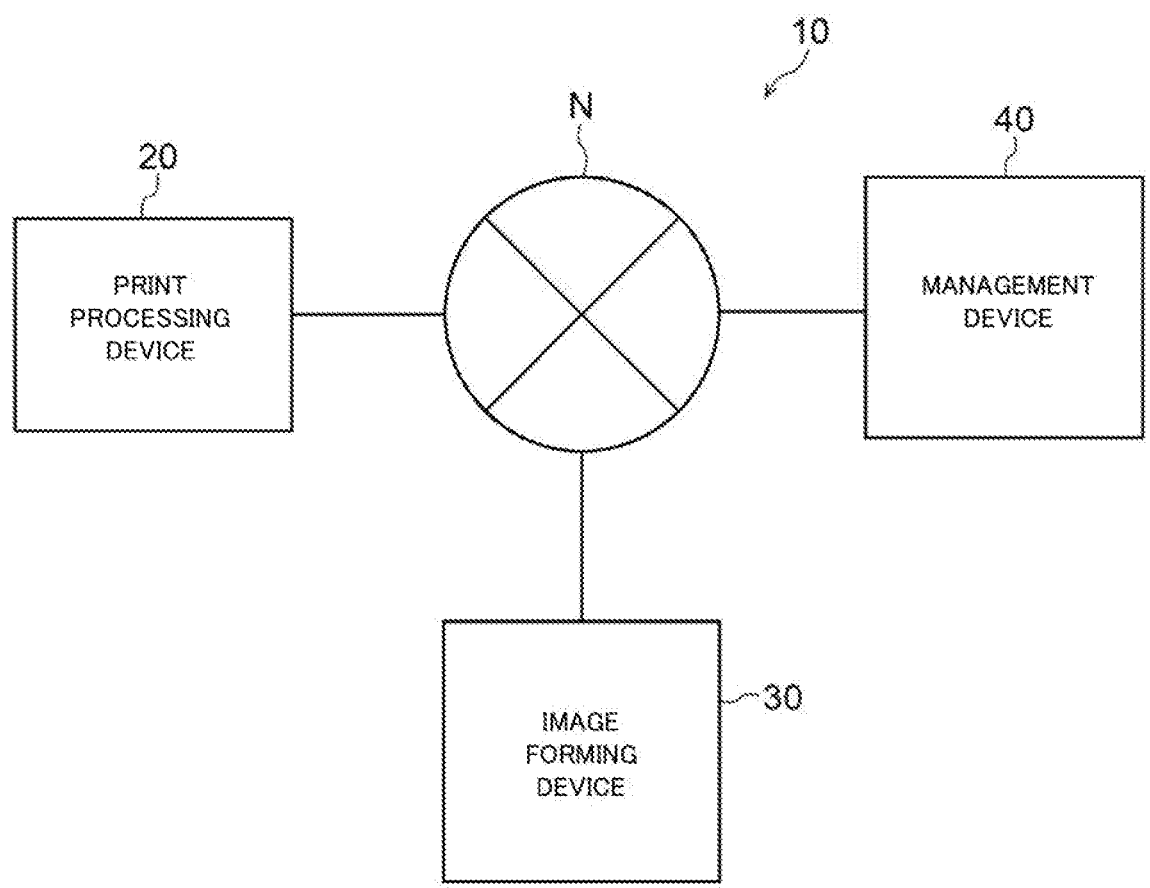
FIG. 1 is a system configuration diagram of continuous paper management system according to the exemplary embodiment.

In the continuous paper management system 10 as shown in FIG. 1, a print processing device 20, an image forming device 30 and a management device 40 are connected via a network N. The network N is, for example, the Internet, a local area network (LAN), a wide area network (WAN) or the like.

The print processing device 20 is a computer that displays a job that may be executed using stocked continuous paper. The "stocked continuous paper" is continuous paper that is not mounted on the image forming device 30 but is stored in a stock storage place such as a warehouse. In the first exemplary embodiment, the stocked continuous paper includes a plural stacks of continuous paper. The stocked continuous paper is an example of the plural stacks of continuous paper, and the job is an example of a printing process.

The image forming device 30 is a multifunction peripheral having a function of executing an image process such as scanning, printing, copying and facsimile (FAX) transmission and reception.

The management device 40 is a computer that stores paper information including a plurality of pieces of information on each stock of continuous paper. The management device 40 stores the paper information using, for example, an HDD, a solid state dive (SSD), a flash memory or the like. Details of the paper information will be described below.

Next, a hardware configuration of the print processing device 20 will be described.

Figure 2:
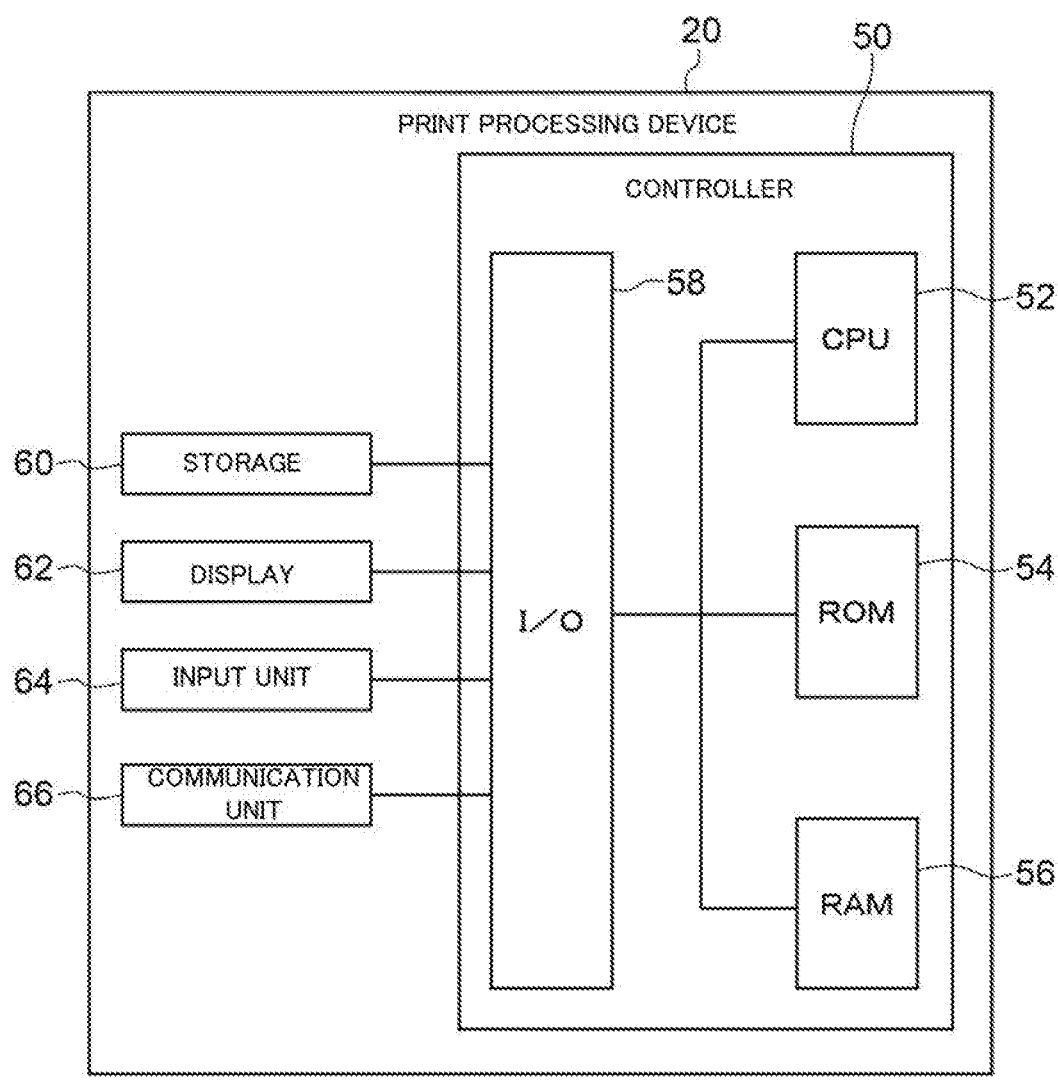
FIG. 2 is a block diagram showing a hardware configuration of a print processing device.

FIG. 2 is a block diagram showing the hardware configuration of the print processing device 20.

As shown in FIG. 2, the print processing device 20 includes a controller 50 that controls operation of the print processing device 20. In the controller 50, a central processing unit (CPU) 52, a read only memory (ROM) 54, a random access memory (RAM) 56, and an input/output interface (I/O) 58 are communicably connected via a bus to be able to communicate with each other.

The CPU 52 is a central processing unit, and executes various programs and controls each unit. That is, the CPU 52 reads a program from the ROM 54, and executes the program using the RAM 56 as a work area. The CPU 52 controls the above components and performs various arithmetic processes according to the program stored in the ROM 54.

The ROM 54 stores various programs and various data. The various programs include at least a print processing program for causing a computer to execute a process performed by the CPU 52 of the print processing device 20. The print processing program may be installed in the print processing device 20 in advance, or may be appropriately installed in the print processing device 20 by being stored in a nonvolatile storage medium or distributed via the network N. Examples of the nonvolatile storage medium include a CD-ROM, a magneto-optical disk, a hard disk drive (HDD), a DVD-ROM, a flash memory, a memory card and the like.

The RAM 56 temporarily stores a program or data as a work area.

A storage 60, a display 62, an input unit 64 and a communication unit 66 are connected to the I/O 58.

The storage 60 is, for example, an HDD, a solid state drive (SSD), a flash memory or the like. The storage 60 stores job information including a plurality of pieces of information on a plurality of jobs. Details of the job information, which is an example of print processing information, will be described below.

The display 62 is, for example, a liquid crystal display (LCD), an organic electro luminescence (EL) display or the like. The display 62 integrally includes a touch panel.

The input unit 64 is provided with an operation key group that receives various instructions from a user of the print processing device 20.

The display 62 and the input unit 64 receive various instructions from the user. The display 62 displays various information such as a result of a process executed according to an instruction received from the user and a notification of the process.

The communication unit 66 is connected to the network N, and communicates with each of the image forming device 30 and the management device 40 via the network N. The image forming device 30 and the management device 40 also have a configuration corresponding to the communication unit 66, and in the first exemplary embodiment, the print processing device 20, the image forming device 30 and the management device 40 connected to the network N may communicate with each other.

Next, main parts of the first exemplary embodiment will be described with reference to FIGS. 3 to 7.

FIG. 3 shows an example of paper information stored in the management device 40.

As shown in FIG. 3, the paper information includes data types of "continuous paper name", "remaining paper amount", "paper width", "coat attribute", "paper thickness" and "open date". The number of data types included in the paper information is not limited, and may be larger or smaller than the number shown in FIG. 3 as long as the "remaining paper amount" is included. The number of stacks of continuous paper is not limited to the number shown in FIG. 3, and may be larger or smaller.

An identifier such as an alphabetic character for uniquely specifying each continuous paper is attached to an end of "continuous paper" in the "continuous paper name".

A remaining paper length corresponding to each continuous paper is stored in the "remaining paper amount".

A paper width corresponding to each continuous paper is stored in the "paper width".

Presence or absence of a coat attribute corresponding to each continuous paper and a type of the coat attribute when the coat attribute is present are stored in the "coat attribute".

A paper thickness corresponding to each continuous paper is stored in the "paper thickness".

A date on which each continuous paper is first mounted on the image forming device 30 is stored in the "open date".

The paper information is input to the management device 40 in the following manner.

In the initial paper information of each continuous paper, a value corresponding to each data type is input manually by the user. The remaining paper amount among the data types is updated each time the continuous paper is mounted on the image forming device 30 and used. For example, in the image forming device 30, each time the continuous paper is used, the usage amount is subtracted from the remaining paper amount, and when the continuous paper is removed, the remaining paper amount at the time of removal is transmitted to the management device 40. Then, in the management device 40, the remaining paper amount transmitted from the image forming device 30 is updated as a new remaining paper amount of the corresponding continuous paper.

Here, each continuous paper shown in FIG. 3 is mounted on the image forming device 30 at least once, and used for printing. That is, each continuous paper shown in FIG. 3 is removed from the image forming device 30 after being used for printing, and stored in the stock storage place such as the warehouse.

FIG. 4 shows an example of the job information stored in the storage 60 of the print processing device 20.

As shown in FIG. 4, the job information includes data types of "job name", "paper usage amount", "paper width", "coat attribute" and "paper thickness". The number of data types included in the job information is not limited, and may be larger or smaller than the number shown in FIG. 4 as long as the "paper usage amount" is included. The number of jobs is not limited to the number shown in FIG. 4, and may be larger or smaller.

The "job name" has an identifier such as a number for uniquely specifying each job at an end thereof.

The "paper usage amount" stores information of a usage amount of the continuous paper necessary for execution of each job.

The "paper width" stores information of a paper width corresponding to each job.

The "coat attribute" stores information of presence or absence of a coat attribute corresponding to each job and a type of the coat attribute when the coat attribute is present.

The "paper thickness" stores information of a paper thickness corresponding to each job.

A value corresponding to the job is input to each data type of the job information for each time when the print processing device 20 receives an input of a job transmitted from a terminal device such as a personal computer (not shown).

Figure 5:
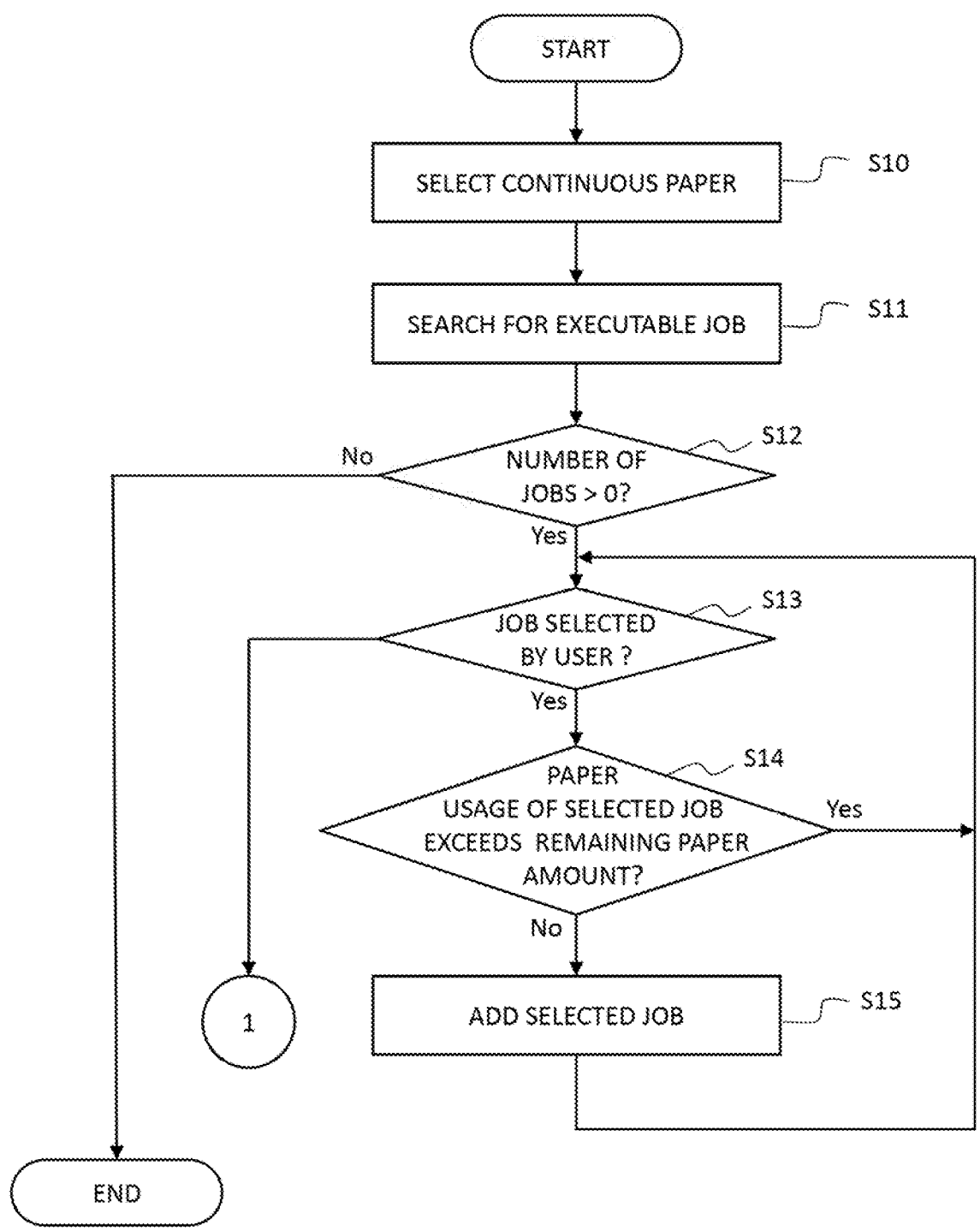
FIG. 5 is a flowchart showing a flow of the continuous paper management system according to a first exemplary embodiment.
Figure 6:
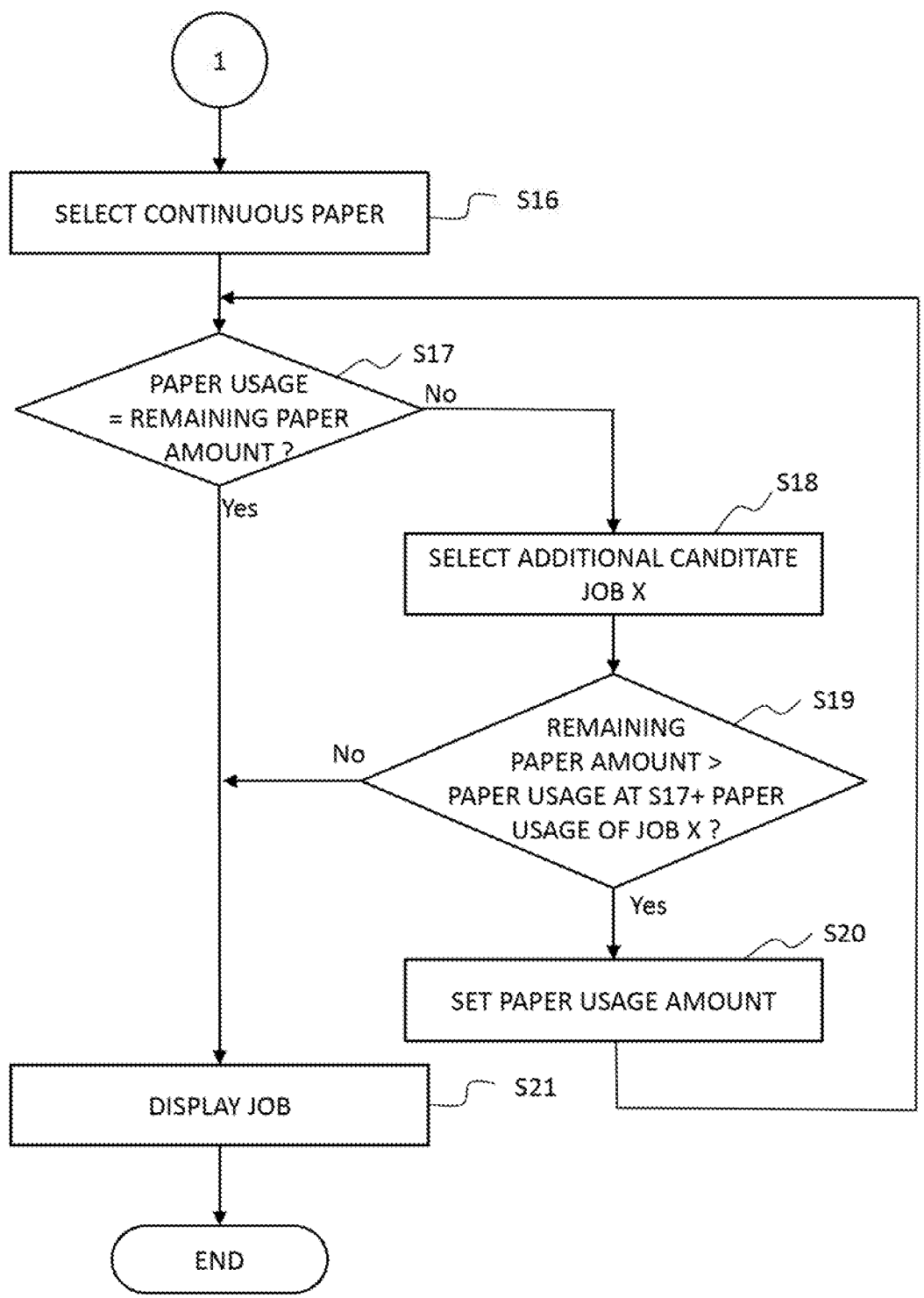
FIG. 6 is a flowchart showing the flow of the continuous paper management system according to the first exemplary embodiment.

FIGS. 5 and 6 are flowcharts showing a flow of the continuous paper management system 10 according to the first exemplary embodiment.

In step S10 shown in FIG. 5, the CPU 52 receives selection of continuous paper. Then, the process proceeds to step S11. For example, when a specific continuous paper is selected from stocked continuous paper displayed on the display 62 based on operation of a user, the CPU 52 receives the selected specific continuous paper as the continuous paper used in the process. The specific continuous paper is one or more stacks of continuous paper contained in the stocked continuous paper. The first exemplary embodiment refers to the specific continuous paper as a stack of continuous paper.

In step S11, the CPU 52 searches for a job that may be executed using the continuous paper selected in step S10. Then, the process proceeds to step S12. It is assumed that the CPU 52 receives a plurality of jobs before the process of the flowcharts shown in FIGS. 5 and 6 is performed.

Here, in step S11, the job including job information corresponding to paper information of the selected continuous paper is searched. The "job information corresponding to paper information" means that a paper usage amount is equal to or smaller than a remaining paper amount, and a paper width, a coat attribute and a paper thickness match.

In step S12, the CPU 52 determines whether the number of jobs in a search result in step S11 is larger than 0. If it is determined that the number of jobs is larger than 0, the process proceeds to step S13, and if it is determined that the number of jobs is not larger than 0, the process ends.

In step S13, the CPU 52 determines whether selection of a job by the user is received. If it is determined that the selection of the job by the user is received, the process proceeds to step S14, and if it is determined that the selection of the job by the user is not received, the process proceeds to step S16 in FIG. 6. For example, when any job is selected from the plurality of jobs displayed on the display 62 based on operation of the user, the CPU 52 determines that the selection of the job by the user is received.

In step S14, the CPU 52 determines whether a result of job selection by the user does not exceed the remaining paper amount of the continuous paper selected in step S10. If it is determined that the remaining paper amount of the continuous paper is not exceeded, the process proceeds to step S15, and if it is determined that the remaining paper amount of the continuous paper is exceeded, the process proceeds to step S13.

In step S15, the CPU 52 adds the job selected by the user. Then, the process proceeds to step S13.

In step S16 shown in FIG. 6, the CPU 52 sets the remaining paper amount of the continuous paper. Then, the process proceeds to step S17. When the process of adding the job in step S15 shown in FIG. 5 is not performed, the "remaining paper amount" here is a "value of the remaining paper amount of the continuous paper selected in step S10". When the process of adding the job in step S15 shown in FIG. 5 is performed, the "remaining paper amount" here is a "value obtained by subtracting a total paper usage amount for added jobs from the remaining paper amount of the continuous paper selected in step S10".

In step S17, the CPU 52 determines whether the remaining paper amount set in step S16 matches the total paper usage amount for the jobs. The total paper usage amount for the jobs in the first step S17 is set to "0". If it is determined that the remaining paper amount and the total paper usage amount of the jobs matches, the process proceeds to step S21, and if it is determined that the remaining paper amount does not match the total paper usage amount for the jobs, the process proceeds to step S18.

In step S18, the CPU 52 selects a job X as an additional candidate. Then, the process proceeds to step S19. The "job X" is not selected as a job to be executed in the process among the jobs in the search result in step S11 shown in FIG. 5, and is a job whose paper usage amount is the smallest among unselected jobs.

In step S19, the CPU 52 determines whether the remaining paper amount is larger than a sum of the paper usage amount in step S17 and the paper usage amount for the job X. If it is determined that the remaining paper amount is larger than the sum of the paper usage amount in step S17 and the paper usage amount for the job X, the process proceeds to step S20, and if it is determined that the remaining paper amount is not larger than the sum of the paper usage amount in step S17 and the paper usage amount for the job X, the process proceeds to step S21.

In step S20, the CPU 52 sets the paper usage amount. Then, the process proceeds to step S17. That is, in step S20, the paper usage amount for the job X is added to the paper usage amount in step S17, and the sum is set as a new paper usage amount.

In step S21, the CPU 52 causes the display 62 to display the job selected above. Then, the process ends.

Figure 7:
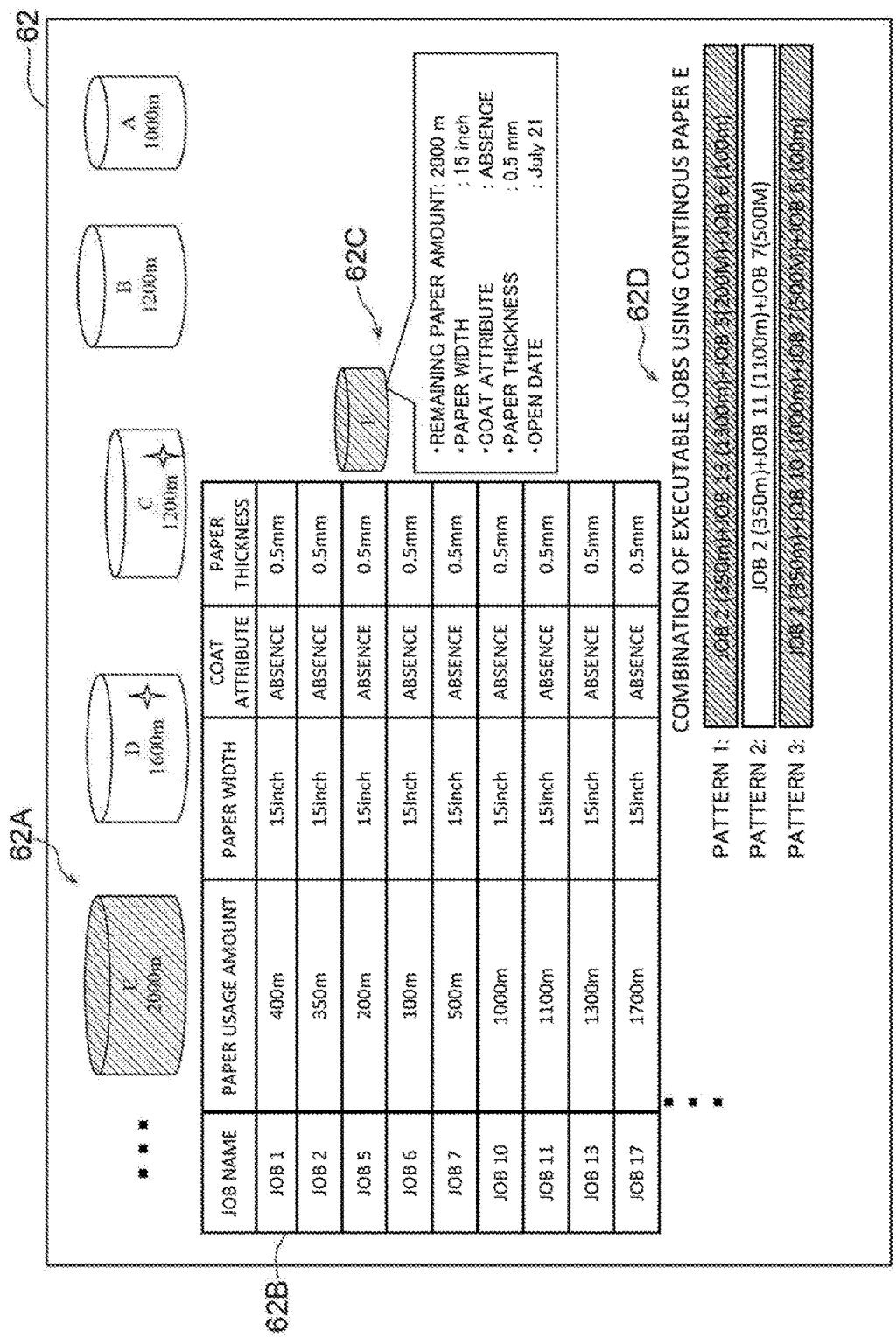
FIG. 7 shows a display example of a display in the continuous paper management system according to the first exemplary embodiment.

Here, FIG. 7 shows a display example of the display 62 in the continuous paper management system 10.

As shown in FIG. 7, the display 62 displays stocked continuous paper information 62A, received job information 62B, selected continuous paper information 62C and job combination information 62D. The number of stacks of stocked continuous paper, the number of received jobs, and the number of combinations of jobs displayed on the display 62 shown in FIG. 7 are an example, and a larger number or a smaller number of stacks, jobs or combinations may be displayed.

During the process of the flowcharts shown in FIGS. 5 and 6, the CPU 52 uses the paper information and the job information to display the combinations of jobs that may be executed using the specific continuous paper based on the paper information of the specific continuous paper in the stocked continuous paper.

For example, in a case shown in FIG. 7, the CPU 52 uses paper information of continuous paper E as the specific continuous paper to search for job information corresponding to the paper information, that is, the selected continuous paper information 62C. Next, the CPU 52 the job information in the search result to cause the display 62 to display the job combination information 62D, on jobs that may be executed using the continuous paper E, in which a job name and a paper usage amount corresponding to each job are indicated. At this time, the combinations of jobs from a pattern 1 to a pattern 3 are displayed as the job combination information 62D on the display 62.

In the first exemplary embodiment, when the user visually recognizes the job combination information 62D displayed on the display 62, the combinations of jobs that may be executed using the specific continuous paper are grasped.

On the other hand, there is a configuration in which continuous paper capable of executing at least one job among a plurality of jobs is manually selected from a plural stacks of continuous paper (hereinafter referred to as a "comparative configuration"). That is, in the comparative configuration, unlike the first exemplary embodiment, the paper information and the job information are not linked in the computer. Therefore, in the comparative configuration, it is necessary for the user to compare the stocked continuous paper with the received job, and to estimate the type and the number of jobs that may be executed using the specific continuous paper. However, it is difficult for a user who is unfamiliar with the work to make the above estimation, and in the comparative configuration, the continuous paper remaining in stock may not be used up efficiently. For example, in the comparative configuration, the continuous paper before reaching the set total paper usage amount for the jobs is used, so that it is assumed that the continuous paper is replaced during the job and productivity is impaired.

However, since the first exemplary embodiment is configured as described above, waste of the continuous paper is reduced as compared with the comparative configuration. Thereby, according to the first exemplary embodiment, a situation in which the stocked continuous paper is left until disposal is resolved, for example, by reducing the number of stacks of continuous paper which compress the stock storage place.

According to selection of the specific continuous paper by the user, the CPU 52 displays the combinations of jobs that may be executed using the selected specific continuous paper.

For example, in the case shown in FIG. 7, the CPU 52 causes the display 62 to display the job combination information 62D of the jobs that may be executed using the continuous paper E according to the selection of the continuous paper E as the specific continuous paper by the user. That is, in the first exemplary embodiment, when the specific continuous paper is selected by the user, the corresponding job combination information 62D is displayed on the display 62. Thereby, although not shown, for example, combinations of jobs that may be executed using the continuous paper A is displayed in response to selection of continuous paper A as the specific continuous paper by the user; or combinations of jobs that may be executed using the continuous paper B is displayed in response to selection of continuous paper B as the specific continuous paper by the user. Therefore, according to the first exemplary embodiment, the user may recognize the combinations of jobs that may be executed using the specific continuous paper. According to the first exemplary embodiment, by appropriately switching the selection of the specific continuous paper by the user, the combination of jobs corresponding to a plural stacks of stocked continuous paper may be recognized.

The CPU 52 displays the combinations of jobs whose total paper usage amount is the maximum while being equal to or smaller than the remaining paper amount of the specific continuous paper.

For example, in the case shown in FIG. 7, the CPU 52 calculates the combinations of jobs whose total paper usage amount is the maximum while being equal to or smaller than the remaining paper amount of 2000 m of the continuous paper E serving as the specific continuous paper. In this case, the CPU 52 calculates, for example, the combinations of jobs whose total paper usage amount is 1950 m. Then, the CPU 52 causes the display 62 to display the job combination information 62D including the calculated combinations of jobs from the pattern 1 to pattern 3. As described above, according to the first exemplary embodiment, the combinations of jobs that consumes the maximum remaining paper amount of the specific continuous paper is displayed.

When the job is selected by the user from the plurality of jobs, the CPU 52 displays the combinations of jobs including the selected job.

In FIG. 7, a job 2 is the job selected by the user. Therefore, the CPU 52 includes the job 2 in the combinations of jobs executed in each pattern of the pattern 1 to the pattern 3. Thereby, the job combination information 62D on the combinations of jobs including the job 2 is displayed on the display 62. Therefore, according to the first exemplary embodiment, the combinations of jobs that consumes the maximum remaining paper amount of the specific continuous paper is displayed while considering the selection by the user.

The CPU 52 causes a combination of jobs having the maximum number of jobs that may be executed to be displayed in a manner different from those of other combinations of jobs.

For example, in the case shown in FIG. 7, the number of jobs that may be executed in the pattern 1 is "4", the number of jobs that may be executed in the pattern 2 is "3", and the number of jobs that may be executed in the pattern 3 is "4". Therefore, the CPU 52 causes the display 62 to display the pattern 1 and the pattern 3, and the pattern 2 in different manners. As an example, in the case shown in FIG. 7, dots are provided as backgrounds in frames of the pattern 1 and the pattern 3, and a white background is provided in a frame of the pattern 2 without any dots.

Thereby, according to the first exemplary embodiment, the combination of jobs having the maximum number of the jobs that may be executed using the specific continuous paper is easily recognized, as compared with a configuration in which all combinations of jobs are displayed in the same manner.

Second Exemplary Embodiment

Next, a second exemplary embodiment will be described while omitting or simplifying parts overlapping with the other exemplary embodiments.

In the second exemplary embodiment, stocked continuous paper usable according to a selected job is displayed on the display 62 of the print processing device 20.

Figure 8:
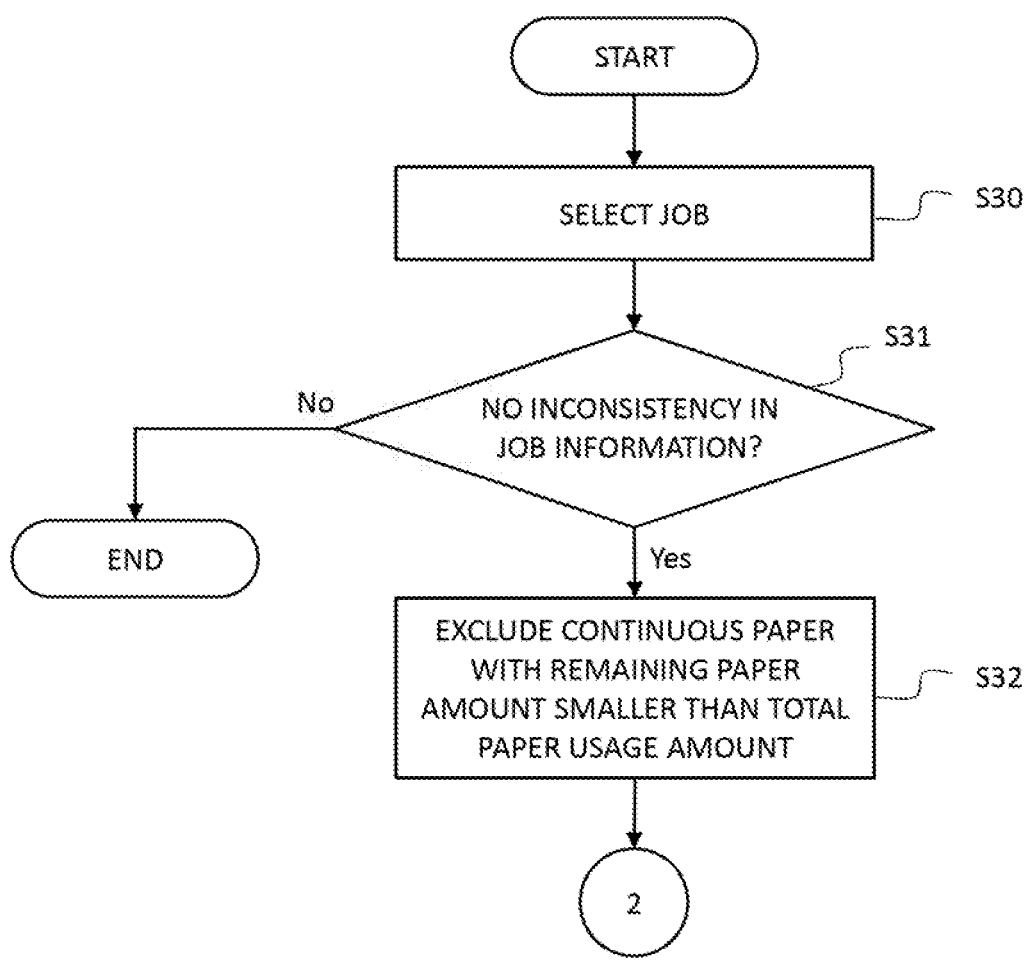
FIG. 8 is a flowchart showing a flow of continuous paper management system according to a second exemplary embodiment.
Figure 9:
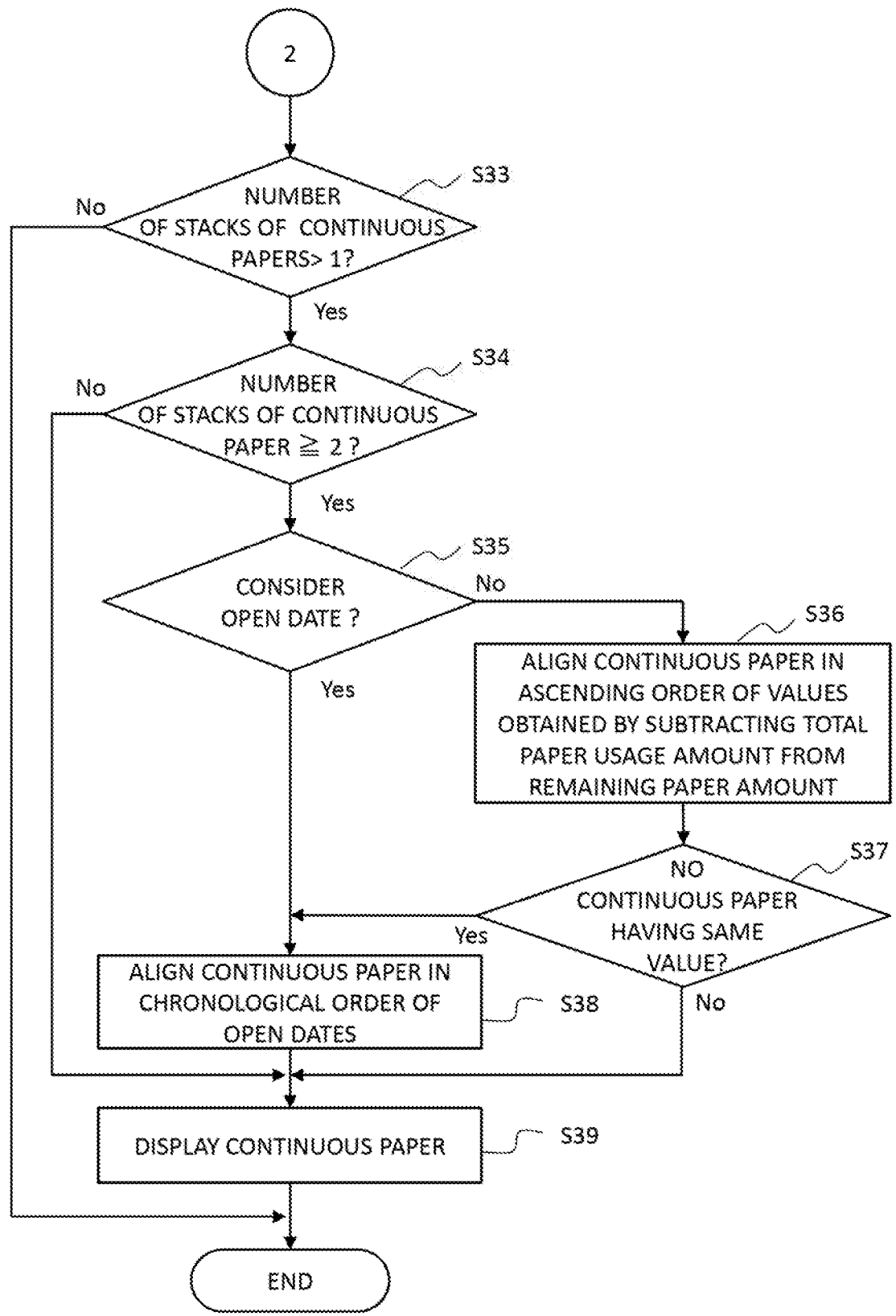
FIG. 9 is a flowchart showing the flow of the continuous paper management system according to the second exemplary embodiment.

FIGS. 8 and 9 are flowcharts showing a flow of the continuous paper management system 10 according to the second exemplary embodiment.

In step S30 shown in FIG. 8, the CPU 52 receives selection of a job. Then, the process proceeds to step S31. For example, when a specific job is selected from a plurality of jobs displayed on the display 62 based on operation of a user, the CPU 52 receives the selected specific job as the job used in the process. The specific job is a single job or a plurality of jobs. In the second exemplary embodiment, the specific job is a plurality of jobs.

In step S31, the CPU 52 determines whether there is any inconsistency in job information on the jobs selected in step S30. If it is determined that there is no inconsistency in the job information on the jobs, the process proceeds to step S32, and if it is determined that there is an inconsistency in the job information on the jobs, the process ends. The "inconsistency in job information" means that values stored in data types of paper width, coat attribute and paper thickness for jobs do not match.

In step S32, the CPU 52 excludes continuous paper whose remaining paper amount is smaller than a total paper usage amount for the jobs selected in step S30, that is, excludes the continuous paper from stocked continuous paper candidates displayed on the display 62. Then, the process proceeds to step S33 in FIG. 9.

In step S33 shown in FIG. 9, the CPU 52 determines whether the number of stacks of usable continuous paper is larger than 1 as a result of exclusion in step S32. If it is determined that the number of stacks of usable continuous paper is larger than 1, the process proceeds to step S34, and if it is determined that the number of stacks of usable continuous paper is not larger than 1, the process ends.

In step S34, the CPU 52 determines whether the number of stacks of usable continuous paper is 2 or more. If it is determined that the number of stacks of usable continuous paper is 2 or more, the process proceeds to step S35, and if it is determined that the number of stacks of usable continuous paper is not 2 or more, the process proceeds to step S39.

In step S35, the CPU 52 determines whether an instruction to consider an open date is received. If it is determined that the instruction to consider the open date is received, the process proceeds to step S38, and if it is determined that an instruction to consider the open date is not received, the process proceeds to step S36. For example, when a check box 62H (see FIG. 10) displayed on the display 62 is selected based on operation of the user, the CPU 52 determines that the instruction to consider the open date is received.

In step S36, the CPU 52 aligns the stacks of continuous paper in an ascending order of values obtained by subtracting the total paper usage amount for the selected jobs from the remaining paper amount of each usable continuous paper. Then, the process proceeds to step S37.

In step S37, the CPU 52 determines whether there is any stacks of continuous paper having the same value as a result of the subtraction in step S36. If it is determined that there is no continuous paper having the same value, the process proceeds to step S39, and if it is determined that there are stacks of continuous paper having the same value, the process proceeds to step S38.

In step S38, the CPU 52 aligns the plural stacks of continuous paper in chronological order of open dates. Then, the process proceeds to step S39. At this time, the CPU 52 calculates the number of days elapsed since the open date by taking a difference between a date on which the process of the flowcharts shown in FIGS. 8 and 9 is executed and the open date of each usable continuous paper stored in the management device 40. The number of elapsed days is an example of the elapsed time. When the process proceeds from step S37 to step S38, the CPU 52 aligns the stacks of continuous paper having the same value as the result of the subtraction in step S36 in the chronological order of open dates. That is, when the process proceeds from step S37 to step S38, only the stacks of continuous paper having the same value are aligned in the chronological order of open dates based on an alignment result in step S36.

In step S39, the CPU 52 causes the display 62 to display the continuous paper selected above. Then, the process ends.

Figure 10:
FIG. 10 shows a display example of a display in the continuous paper management system according to the second exemplary embodiment.

Here, FIG. 10 shows a display example of the display 62 in the continuous paper management system 10.

As shown in FIG. 10, the display 62 displays received job information 62E, selected continuous paper information 62F and open date consideration information 62G. The number of received jobs and number of stacks of selected continuous paper displayed on the display 62 shown in FIG. 10 are an example, and a larger number or a smaller number of jobs or stacks may be displayed.

The display 62 displays the check box 62H and an explanation display 62I as the open date consideration information 62G.

During the process of the flowcharts shown in FIGS. 8 and 9, when presenting two or more stacks of continuous paper in the stocked continuous paper whose remaining paper amount is equal to or larger than the total paper usage amount for a specific job among the plurality of jobs, the CPU 52 displays the two or more stacks of continuous papers in the chronological order of open dates upon receiving the instruction to consider the open date.

For example, in a case shown in FIG. 10, the CPU 52 receives selection of a job 1, a job 2 and a job 5 based on the selection by the user. In FIG. 10, dots are provided as backgrounds of the job information on the jobs whose selection is received.

The CPU 52 causes the display 62 to display the continuous paper A, the continuous paper B and the continuous paper E serving as the stocked continuous paper whose remaining paper amount is equal to or larger than the total paper usage amount of 950 m for the job 1, job 2 and job 5 as specific jobs, as the selected continuous paper information 62F.

At this time, since the check box 62H is selected, the CPU 52 determines that the instruction to consider the open date is received, and aligns the continuous paper A, the continuous paper B and the continuous paper E in the chronological order of open dates. Specifically, the CPU 52 calculates the number of days elapsed since the open date by taking a difference between an execution date of the process and the open date of each of the continuous paper A, the continuous paper B and the continuous paper E stored in the management device 40. As a result, the number of elapsed days of the continuous paper A is "30 days", the number of elapsed days of the continuous paper B is "20 days", and the number of elapsed days of the continuous paper E is "10 days". The CPU 52 causes the continuous paper to be displayed in the chronological order of open dates from right to left on the display 62, and as a result, the continuous paper A is displayed at a right end, the continuous paper B is displayed at a center, and the continuous paper E is displayed at a left end as the selected continuous paper information 62F on the display 62.

As described above, according to the second exemplary embodiment, two or more stacks of continuous paper in the plural stacks of continuous paper are displayed in the chronological order of open dates.

The CPU 52 causes the continuous paper whose open date is equal to or larger than a predetermined value to be displayed in a manner different from those of other stacks of continuous paper. At this time, the "predetermined value" may be set to any value based on operation of the display 62 or the input unit 64 by the user.

For example, in the case shown in FIG. 10, "20" is set as the predetermined value. Therefore, the CPU 52 causes the display 62 to display the continuous paper A and the continuous paper B, and the continuous paper E in different manners in the selected continuous paper information 62F. As an example, in the case shown in FIG. 10, lower-leftward diagonal lines are provided as backgrounds in frames of the continuous paper A and the continuous paper B, and a white background is provided in a frame of the continuous paper E without any lower-leftward diagonal lines.

Thereby, according to the second exemplary embodiment, the continuous paper whose open date is equal to or larger than the predetermined value is easily recognized, as compared with a configuration in which all stacks of continuous paper are displayed in the same manner.

Others

In the above exemplary embodiment, the continuous paper management system 10 includes the management device 40, and the management device 40 stores the paper information. However, the print processing device 20 may store the job information and the paper information without providing the management device 40.

In the above exemplary embodiment, the process ends based on a fact that the job that may be executed using the stocked continuous paper is displayed on the display 62.

However, the present invention is not limited thereto, and when the user inputs a sort condition, the CPU 52 may sort an order of the jobs displayed on the display 62 according to the sort condition.

Since a case where there are a plurality of jobs that may be executed using the stocked continuous paper has been described as an example in the above exemplary embodiment, the combinations of jobs are displayed in FIG. 7. However, when there is a single job that may be executed, the single job that may be executed is displayed instead of the combinations of jobs. Similarly, since a case where there is a plural stacks of stocked continuous paper usable according to the selected jobs has been described as an example in the above exemplary embodiment, the plural stacks of continuous paper are displayed in FIG. 10. However, when the number of usable stocked stacks of continuous paper is one, a single usable set of stocked continuous paper is displayed.

In the above exemplary embodiment, as shown in FIG. 10, the two or more stacks of continuous paper are displayed in a descending order of the number of elapsed days from right to left on the display 62 by displaying two or more stacks of continuous paper in the chronological order of open dates. However, the present invention is not limited thereto, and the two or more stacks of continuous paper may be displayed in an ascending order of the number of elapsed days from right to left on the display 62, or the two or more stacks of continuous paper may be displayed in the ascending or descending order of the number of elapsed days from left to right, top to bottom, or bottom to top on the display 62.

In the above exemplary embodiment, the CPU 52 of the print processing device 20 is an example of a processor. The term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A print processing device comprising a processor configured to:
    use paper information including at least information of remaining amounts of a plural stacks of continuous paper as information of the continuous paper and print processing information including information of a plurality of print processes and information of paper usage amounts used in the plurality of print processes, wherein the paper information further includes information of elapsed times from starts of managements of each continuous paper, and the print processing information further includes information of the paper usage amounts used in each of the plurality of printing processes;
    display information of at least one of executable print processes that are executable based on paper information of specific continuous paper including information of a remaining amount of the specific continuous paper among the plural stacks of continuous paper, and display information of a combination of print processes in which total of paper usage amounts is maximum within the remaining amount of the specific continuous paper;
    display information of two or more stacks of continuous paper in an ascending or descending order of the elapsed time upon receiving an instruction to consider the elapsed time when displaying information of two or more stacks of continuous paper among the plural stacks of continuous paper with remaining amounts equal to or larger than total of the paper usage amounts used for specific print processes among the plurality of print processes; and
    display information of the continuous paper with the elapsed time being equal to or larger than a predetermined value in a manner different from the other stacks of continuous paper.

2. The print processing device according to claim 1, wherein
    the processor is configured to display information of at least one of the print processes that are executable using the specific continuous paper selected by a user.

3. The print processing device according to claim 1, wherein the processor is configured to display information of a combination of print processes including a print process selected from the plurality of print processes by a user.

4. The print processing device according to claim 1, wherein the processor is configured to display a combination of maximum number of executable printing processes in a manner different from the other combinations of printing processes.

5. The print processing device according to claim 3, wherein the processor is configured to display information of a combination of maximum number of executable printing processes in a manner different from the other combinations of printing processes.

6. A non-transitory computer readable medium storing a program causing a computer to execute a process for:
    using paper information including at least information of remaining amounts of a plural stacks of continuous paper as information of the continuous paper and print processing information including information of a plurality of print processes and information of paper usage amounts used in the plurality of print processes, wherein the paper information further includes information of elapsed times from starts of managements of each continuous paper, and the print processing information further includes information of the paper usage amounts used in each of the plurality of printing processes;
    displaying information of at least one of executable print processes that are executable based on paper information of a specific continuous paper including information of a remaining amount of the specific continuous paper among the plural stacks of continuous paper, and displaying information of a combination of print processes in which total of paper usage amounts is maximum within the remaining amount of the specific continuous paper;

displaying information of two or more stacks of continuous paper in an ascending or descending order of the elapsed time upon receiving an instruction to consider the elapsed time when displaying information of two or more stacks of continuous paper among the plural stacks of continuous paper with remaining amounts equal to or larger than total of the paper usage amounts used for specific print processes among the plurality of print processes; and displaying information of the continuous paper with the elapsed time being equal to or larger than a predetermined value in a manner different from the other stacks of continuous paper.

7. A processor configured to:

use paper information including at least information of remaining amounts of a plural stacks of continuous paper as information of the continuous paper and print processing information including information of a plurality of print processes and information of paper usage amounts used in the plurality of print processes, wherein the paper information further includes information of elapsed times from starts of managements of each continuous paper, and the print processing information further includes information of the paper usage amounts used in each of the plurality of printing processes;

display information of at least one of executable print processes that are executable based on paper information of a specific continuous paper including information of a remaining amount of the specific continuous paper among the plural stacks of continuous paper, and display information of a combination of print processes in which total of paper usage amounts is maximum within the remaining amount of the specific continuous paper;

display information of two or more stacks of continuous paper in an ascending or descending order of the elapsed time upon receiving an instruction to consider the elapsed time when displaying information of two or more stacks of continuous paper among the plural stacks of continuous paper with remaining amounts equal to or larger than total of the paper usage amounts used for specific print processes among the plurality of print processes; and display information of the continuous paper with the elapsed time being equal to or larger than a predetermined value in a manner different from the other stacks of continuous paper.

\* \* \* \* \*